United States Patent [19]

Harrison

[11] 4,042,263
[45] Aug. 16, 1977

[54] PIPE COUPLINGS

[76] Inventor: Geoffrey Harrison, Brymar, Manley Road, Ilkley, West Yorkshire, England

[21] Appl. No.: 588,872

[22] Filed: June 20, 1975

[51] Int. Cl.[2] .............................................. F16L 17/00
[52] U.S. Cl. .................................... 285/110; 285/328; 285/369; 285/379; 285/423
[58] Field of Search ............... 285/379, 423, 369, 328, 285/110

[56] References Cited

U.S. PATENT DOCUMENTS

| 2,443,145 | 6/1948 | Payne | 285/110 |
|---|---|---|---|
| 3,127,196 | 3/1964 | Fabian | 285/379 X |
| 3,284,112 | 11/1966 | Martin | 285/328 |
| 3,857,589 | 12/1974 | Oostenbrink | 285/379 X |

FOREIGN PATENT DOCUMENTS 1,240,808   7/1971   United Kingdom ................. 285/379

Primary Examiner—Dave W. Arola
Attorney, Agent, or Firm—Reed, Smith, Shaw & McClay

[57] ABSTRACT

The specification discloses a coupling sleeve for coupling together lengths of pipe in substantially sealed relationship. The coupling sleeve has a socket portion for a pipe, and a resilient annular seal is mounted at the outer end of the socket portion for engagement by the leading end of the pipe when the latter enters the socket portion. The seal is retained in position by means of a locking ring snap-fitted over an outwardly extending abutment provided on the socket portion. To provide a seal against liquid leakage along interfaces between the seal and the end surface of the socket portion, and also between the seal and the adjacent surface of the locking ring, a narrow land portion of the seal undergoes substantial axial compression by the locking ring.

5 Claims, 5 Drawing Figures

PIPE COUPLINGS

BACKGROUND TO THE INVENTION

This invention relates to pipe couplings comprising coupling sleeves for coupling together lengths of pipe in substantially sealed relationship.

The invention is primarily, though not exclusively, concerned with a coupling sleeve for coupling together two lengths of pipe of the type used in sewers, drains and cable conduits, such pipes generally being clay-ware pipes through they may also be of synthetic plastics material.

In the coupling of a pipe in a coupling sleeve, a resilient seal is usually provided so as to prevent liquid material, which passes through the pipe, from escaping to externally of the pipe in the region of the coupling of the pipe to the coupling sleeve and/or in the region of the junction (in the coupling sleeve) between the end of the pipe and the end of a further pipe received in the coupling sleeve.

It is known to provide a seal arrangement, for sealing the entrance of a pipe into a coupling sleeve, and taking the form of a resilient annular seal which is located at one end of the coupling sleeve, and is retained in position by means of a locking ring snap-fitted onto the end of the sleeve. Thus, the seal is shaped to receive the end of the sleeve, and also in turn is received by the locking ring. The seal has a radially inwardly projecting rib which is engaged by a pipe when entered into the sleeve, the rib deflecting part-axially so as to permit entry of the pipe and yet, by the resilience of the seal, maintaining diametric sealing pressure between the coupling sleeve and the external surface of the pipe.

This known arrangement suffers from disadvantages. It is a time consuming and costly task to assemble the arrangement (which is usually carried out by manual/machine manipulation), with evident disadvantage whether the assembly is carried out on the factory floor or on site. Further, the assembly does not always guarantee satisfactory sealing in the event that a pipe is presented which differs substantially from the "norm" shape of pipe which the coupling sleeve is designed to operate with. It is a common experience that pipes, particularly clay-ware pipes, may be ovalised to a certain extent. Evidently, this will give rise to less satisfactory peripheral seal regions where the pipe radius is less than the norm. In such event, liquid can leak round the back of the seal (with respect to the entry direction of the pipe), and may ultimately leak between the inside surface of the seal and the adjacent surface of the end of the coupling sleeve.

SUMMARY OF THE INVENTION

It is an object of the invention to provide a coupling sleeve and seal arrangement which is easy to assemble and yet which provides satisfactory resistance to liquid leakage.

According to one aspect of the invention there is provided a coupling sleeve adapted to couple at least one pipe thereto and comprising;

a socket portion dimensioned to receive said pipe;

a resilient annular seal mountable at the outer end of said socket portion and engageable, in use, by the leading end of the pipe when the latter enters said socket portion;

and a locking ring engageable over the outer end of said socket portion and having a radial portion for retaining the seal in position adjacent the outer end of said socket portion;

wherein said resilient annular seal comprises;

a radially outer portion which is shaped to co-operate with the outer end of said socket portion and with said locking ring so as to resist radial inward movement of the seal;

a radially inner portion which is deflectable to permit entry of said pipe and which is subsequently displaceable into sealing engagement with the external surface of said pipe by the inherent resilience of the seal;

and a radial intermediate portion which is engageable with the surface of the outer end of said socket portion and which is axially compressible by the locking ring between the latter and said surface;

and wherein said socket portion has a peripheral outwardly extending abutment engageable by said locking ring, when the latter is fitted over the outer end of said socket portion, whereby said locking ring applies axial thrust to said intermediate portion of the seal between the surface of said end of the socket pocket and said radial portion of the locking ring.

Thus, in use the location of the intermediate seal portion under axial thrust (preferably sufficient to compress the intermediate portion by at least 15%) between the surface of the end of the socket portion and the radial portion of the locking ring provides a powerful sealing action against liquid leakage.

In the assembly of the seal and ring on the sleeve, it is convenient to employ power operated apparatus which is capable of generating substantial axial thrust in the fitting together of the locking ring end the sleeve, so as to compress the intermediate portion of the seal until the locking ring engages with the abutment of the sleeve, preferably by snap-fitting over the abutment. Since substantial axial thrust is employed, and in view of the small sealing areas involved, a very substantial sealing pressure is provided between the intermediate portion of the seal and the surfaces of the end of the socket portion and the radial portion of the locking ring.

According to another aspect of the invention there is provided a coupling sleeve adapted to couple at least one pipe thereto and comprising;

a socket portion dimensioned to receive said pipe;

a resilient annular seal mountable at the outer end of said socket portion and engageable, in use, by the leading end of the pipe when the latter enters said socket portion;

and a locking ring engageable over the outer end of said socket portion and having a radial portion for retaining the seal in position adjacent the outer end of said socket portion;

wherein said resilient annular seal comprises;

a radially inner portion which is deflectable to permit entry of said pipe and which is subsequently displaceable into sealing engagement with the external surface of said pipe by the inherent resilience of the seal;

and a radially outer portion which is engageable with the surface of the outer end of said socket portion and which is so arranged, with respect to said outer end and the locking ring, as to be axially compressible by at least 15% in order to fit between the surface of said outer end and the surface of said radial portion of the locking ring, thereby to exert sealing action at said surfaces;

and wherein said socket portion has a peripheral outwardly extending abutment engageable by the locking ring, when the latter is fitted over said outer end, whereby the locking ring applies axial thrust to said outer portion of the seal between said surfaces.

Preferably, the outer portion of the seal, in the coupling sleeve according to the further aspect of the invention, includes a portion which is shaped to co-operate with the end of the sleeve and with the locking ring so as to resist radial inward movement of the seal. Further, it either aspect of the coupling sleeve, it is preferred that the shaped portion of the seal should take the form of a wedge as seen in radial section. Thus, at least one side of the shaped portion may converge radially inwardly. Conveniently, the convergent side can engage with a correspondingly inclined side portion in the end of the socket portion. The other side of the shaped portion may be radial, in which case the mating surface of the radial portion of the locking ring can also be radial.

Therefore, the locking ring may be constructed as a simple moulding comprising an outer axially extending portion which engages over the abutment on the socket portion and extends therealong, and a radial portion extending inwardly therefrom.

In order to provide a seal which is resistant to forces tending to dislodge the seal radially inwardly from its location, it is preferred that the portion of the seal which is subjected to axial thrust has only a small axial extent as compared with the axial extent of the shaped portion of the seal.

A further problem with existing seal arrangements for coupling sleeves is that, upon entry of a pipe into the coupling sleeve, fairly substantial radial pressure is exerted on the portion of the seal engage by the pipe, whereby the seal applies substantial radially outwardly directed forces to the wall of the sleeve and also to the locking ring. This generates substantial hoop stresses both in the wall of the sleeve and also in the locking ring which gives rise to "creep" in the locking ring and the body of the sleeve. This phenomenon is a well known problem in the art, and evidently will give rise to less satisfactory sealing at the sealing surfaces between the seal and the coupling sleeve and the locking ring.

Therefore, in order to overcome or at least minimise the problem of "creep" generation in the locking ring, according to a preferred feature of the invention the locking ring is provided with an axially extending portion (engageable over the abutment of the socket portion) which has a substantial axial extent. Evidently, this will increase the area of locking ring which is resistant to the hoop forces generated, thereby reducing the hoop stress creep in the locking ring. By way of example only, the axial extent of the axial portion of the locking ring must be longer than the overall axial maximum compressed extent of the seal.

The shaping of the portion of the seal which is engageable, in use, with the external surface of a pipe entered into the socket portion, may be selected according to the intended operating environment and the particular type of pipe. By way of example, this portion of the seal may take the form, in radial section, of a rounded T shape with the stem extending radially inwardly.

Conveniently, the abutment provided on the socket portion may take the form of a circumferential rib extending throughout the circumference of the socket portion. If it should be required to increase the resistance to relative axial separation between the locking ring and the coupling sleeve, a plurality of abutments may be provided on the periphery of the socket portion, engageable by respective portions of the locking ring. Thus, the abutment may comprise a pair of circumferential rings axially spaced from each other.

The preferred material from which the coupling sleeve and/or the locking ring is made is polypropylene, preferably injection moulded. The material of the seal may be of any suitable natural rubber, synthetic rubber, or other seal-type material selected in accordance with the intended operating environment.

BRIEF DESCRIPTION OF THE DRAWINGS

The invention will now be descrived in more detail, by way of example only, with reference to the accompanying drawing in which.

DESCRIPTION OF PREFERRED EMBODIMENTS

Figure 1:
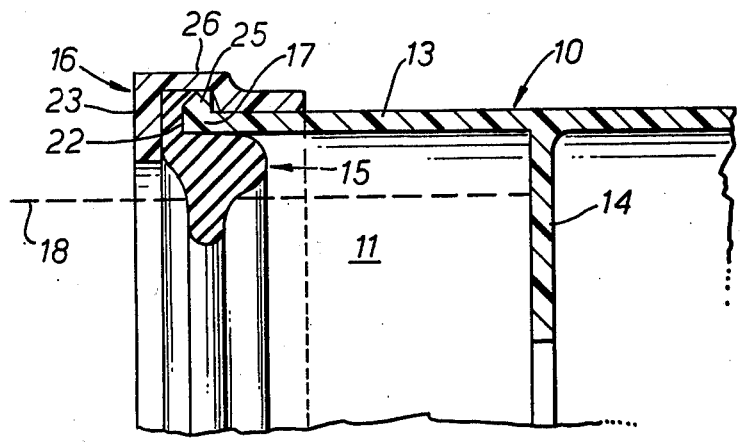
FIG. 1 is a fragmentary view, in axial section, of one end of a coupling between sleeve according to the invention.

Referring now to FIG. 1 of the drawing, there is shown a coupling sleeve designated generally by reference numeral 10. The sleeve is intended to couple one or more lengths of pipe thereto in sealed relationship, though for convenience the arrangement for receiving one pipe only is shown. However, it is to be understood that the coupling sleeve 10 may be generally cylindrical, and provided with appropriate sockets, when it is desired to couple together two lengths of pipe "in line," whereas the sleeve may be formed with a bend of any desired angle, with appropriate sockets at each end of the sleeve, in order to couple together two lenghts of pipe at any predetermined angle therebetween. Furthermore, the coupling sleeve 10 may be provided with branch extensions to enable the coupling together or more than two pipes if desired. Therefore, the following description will be in regard to a single socket portion of a coupling sleeve, though it is to be understood that similar socket portions and respective seal arrangements may be provided at different locations in the sleeve in order to receive further pipes.

The sleeve 10 shown in FIG. 1 has a socket portion 11 which is intended to receive the end of a pipe (not shown) which is to be coupled with the sleeve 10 and is entered into the socket 11 in the direction of the arrow 12. The socket 11 is defined partly by a portion 13 of the cylindrical wall of the sleeve, and also by an annular wall 14 extending radially inwardly from the cylindrical wall of the sleeve. The wall 14 constitutes an abutment stop against which the end of the pipe can engage in order to locate the pipe in the socket 11. When the sleeve 10 is coupling together two pipes in line, a further pipe will enter a socket portion to the right of wall 14 until it abuts the opposite side of the wall 14 from that engaged by the pipe in socket 11.

At the entrance end to the socket portion 11, the sleeve 10 is provided with a sealing arrangement which comprises a resilient annular seal designated generally by reference numeral 15 and a slightly flexible locking ring 16. The ring 16 is capable of being snap-fitted over the end 17 of the sleeve 10 in order to retain the seal 15 in position against the surface at the end 17. Upon entry of a pipe in the direction of the arrow 12, an inner portion of the seal 15 is deflected part-axially by engagement with the leading end of the pipe, the portion subsequently springing back into sealing engagement with the external surface of the pipe by the inherent resilience of the seal. A typical path of entry of the outer periphery of a pipe is shown by the dashed line 18 in FIG. 1, from which it will be apparent that the seal 15 will be engaged by the pipe as it enters socket 11.

Figure 3:
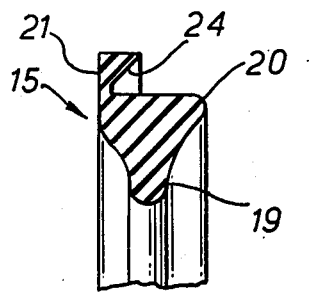
FIG. 3 is a view of a seal used in the coupling.

Referring now to FIG. 3 of the drawings, there is shown a radial section the seal 15. The seal 15 comprises a first, radially inner portion 19 which is normally deflectable by contact with a pipe entering the socket, and can make sealing contact with the external surface of the pipe. The seal 15 also includes a lobe portion 20 which forms a seal with the internal surface of wall portion 13. Moreover, upon deflection of portion 19 to the right upon entry of a pipe, it will be evident that the portions 19 and 20 effectively constitute two limbs of U, this stressing of these two portions providing sealing pressure for the seal both against the external surface of the pipe (by means of portion 19), and also against the internal surface of wall portion 13 (by means of portion 20). The seal 15 also includes an intermediate portion 21 which is a portion having a short extent in the axial and radial direction. One radial surface of portion 21 is intended to form a powerful sealing action with a radial surface 22 of the end 17 of the sleeve, whereas the opposed radial surface of portion 21 forms a powerful sealing action with a radial surface of a radial portion 23 of locking ring 16. Finally, the seal 15 has a radially outer portion 24 which is a shaped portion, and which is intended to co-operate with mating surfaces of the end 17 of the sleeve, and also with the locking ring 16, in such manner as to oppose radial inward dislodgement of the seal 15 from its mounted position. Thus, as shown in FIGS. 1 and 3, the portion 24 is generally wedge shaped, the wedge being constituted by one radial surface, and one surface converging radially inwardly. As seen in FIG. 1, the convergent surface of portion 24 mates with a corresponding inclined surface provided on peripheral rib 25 at the end of sleeve 10. In FIGS. 1 and 3, the seal 15 is shown with its intermediate portion 21 in an axially compressed state, i.e., the portion 21 is axially compressed by about 30 to 40% of its relaxed axial extent. As will be described in more detail below, this is the preferred axial compression, though it is envisaged that the coupling may provide a satisfactory seal when axial compression is provided in the range 15 to 60% for the portion 21.

As mentioned above, locking ring 16 has a radial portion 23 which is engageable with one side of intermediate portion 21 of the seal 15. The locking ring 16 also includes an axially extending portion 26 which can fit over the end 17 of sleeve 10, and can come into snap-fitted engagement over rib 25 provided on sleeve 10. In the assembly of the seal at the end 17 of the sleeve 19, it is preferred that power operated apparatus be employed in order to press the locking ring 16 into position. In this way, it will be possible to generate substantial axial thrust, and in simple manner, whereby the locking ring 16 can lock itself tightly on the sleeve 10 so as to resist axial separation between these members. The generation of this substantial axial thrust will be taken mainly by the intermediate portion 21 of the seal 15, which thereby undergoes axial compression until such time as the axial portion 26 of ring 16 comes into engagement over and behind rib 25. Thus, the rib 25 constitutes an abutment which is engageable by the locking ring 16.

It will be noted that the sealing areas, sealed by intermediate portion 21 of seal 15, are very small, e.g., the area of surface 22 of end 17, and this will give rise to a very high sealing pressure being provided between the intermediate portion 21 and the contacting surfaces in view of the large axial thrust which will be generated in portion 21 during its compression.

Therefore, although portions 19 and 20 of the seal 15 may provide satisfactory sealing for most operating conditions with the types of pipes typically coupled to the sleeve, in the event of leakage occurring past these portions 19 and 20 a very resistant seal will be provided opposing leakage between surface 22 and the radial internal surface of radial portion 23, by means of the axially compressed intermediate portion 21 of the seal 15.

Furthermore, the very high pressures prevailing between intermediate portion 21 and the adjacent surfaces will provide strong resistance to dislodgement of the seal from its mounted position. In this respect, the provision of shaped portion 24 of the seal 15 will also contribute significantly to providing resistance to radially inward dislodgement of the seal, both during assembly of the seal arrangement, and also in use.

As mentioned above, upon entry of a pipe in socket portion 11, the seal portion 19 is deflected laterally so as to constitute one limb of a U, the other limb being constituted by the portion 20 which is pressed radially outwardly into further sealing engagement with the internal surface of wall 13. This generates quite substantial radial forces in the seal 15 which must be absorbed by the wall 13 and the locking ring 16. These forces are converted into hoop stresses in the wall 13 and locking ring 16 and, in known coupling and sealing arrangements, this can give rise to the known phenomonen of "creep." However, in the illustrated arrangement, the locking ring 16 is provided with axial portion 26 which has substantial axial extent thereby to increase the area of material absorbing the hoop forces, thereby reducing the hoop stresses. By way of example, the axial extent of portion 26 of ring 16 may be at least 1.1 and preferably about one half times the overall axial extent of seal 15 and/or up to ten times the axial extent of portion 21.

Figure 2:
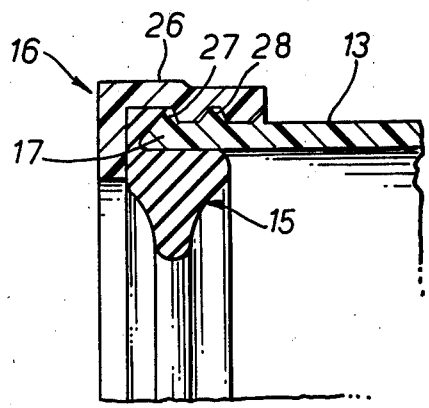
FIG. 2 is a detailed view of a modification of the end of the coupling sleeve of FIG. 1.

Referring now to FIG. 2 of the drawings, there is shown a modified arrangement for the sleeve 10, the modification being in regard to the abutment provided at the end 17. If greater resistance of axial separation is required, then further abutments may be provided which are engaged by matching portions of the locking ring 16. As shown in FIG. 2, abutments are provided in the form of a pair of circumferential ribs 27 and 28 over which the axial portion 26 of locking ring 16 can be taken, and move into snap-engagement therewith.

In order to minimize the hoop stresses generated, it is preferred that the radial clearance between the outer surface of the abutment(s) and the internal surface of axial portion 26 should be from bare clearance to interference fit in the assembled state.

The preferred material employed in the manufacture of the coupling sleeve 10 and locking ring 16 is polypropylene, preferably injection moulded. However, other materials conventionally employed may be used. The seal 15 also may be in any conventionally employed material, depending on the intended operating environment. Rubber or synthetic rubber may be employed.

Furthermore, while the seal 15 has been described and illustrated as being generally of rounded T-shape in radial section, it is to be understood that at least the portions 19 and 20 may be replaced by other known seal shapings depending upon the operating environment and the type of pipe which is intended to be coupled with the sleeve.

In addition to providing improved resistance to liquid leakage, the described embodiments with high interface pressure joints are also advantageous in resisting root penetration from plants and trees. This is a problem encountered particularly abroad, e.g., parts of America, Australia and New Zealand, in which there is a risk of interference with the seal by root penetration when only low interface pressures are involved.

If it should be required to increase the resistance to dislodgement of the seal in use, particularly upon entry of a pipe into the coupling, the locking ring or end cap 16 may be provided with an anti-slip configuration which engages the seal 15. Alternately, or additionally, the coupling sleeve may be provided with an anti-slip configuration engaging the seal and taking the form of ribbing on the end of the sleeve.

Figure 4:
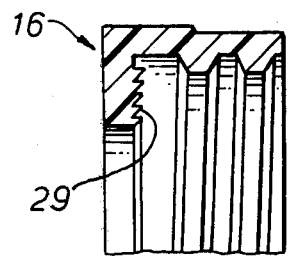
FIG. 4 is a detail view of a further modification of the coupling.

One form of anti-slip configuration for the cap 16 is shown in FIG. 4 at 29, this being generally saw-toothed with the teeth angled so as to oppose radial inward movement of the part of the seal in engagement therewith. Although not shown, it will be the intermediate (axially compressible) portion 21 which is engaged, in the assembled state, by the anti-slip configuration. It is to be understood that many other anti-slip configurations may be provided, e.g., circular "blisters" or other surface roughening of sufficient size as to effect gripping penetration into the seal, while not having any adverse affect on the sealing properties of the coupling. Further, the anti-slip configuration is shown only by way of example as applied to the locking ring 16 of the FIG. 2 embodiment.

Figure 5:
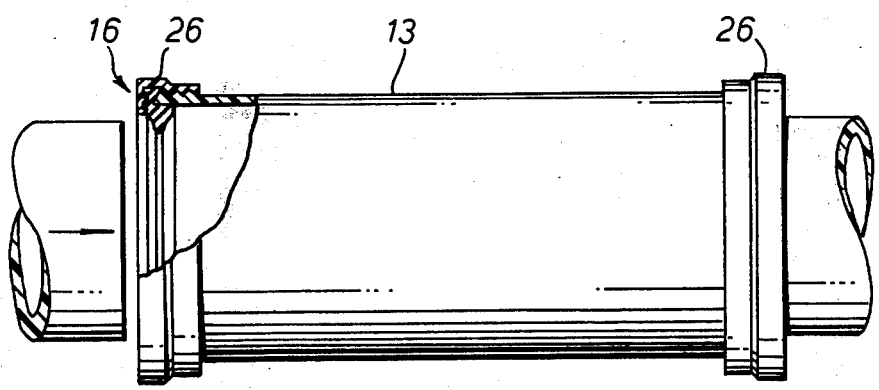
FIG. 5 is a general view of one example of coupling sleeve for coupling together two lengths of pipe.

In FIG. 5 of the drawings, there is shown a general view of one example of coupling sleeve for coupling together, in sealed relationship, two pipes to the sleeve.

I claim:

1. A flexible-joint pipe coupling comprising:
   a. a cylindrical coupling sleeve having at least one annular abutment member positioned within said sleeve to define a pipe receiving socket and at least one rib circumferentially positioned and having a bevel at the end of the sleeve;
   b. an annular locking ring having an inner diameter less than the inner diameter of said sleeve and including a planar radial abutment surface axially spaced apart from said rib level, and an axially extending portion having at least one first and second inner surface, said radial abutment surface extending from the inner diameter of said ring to said first surface, said first surface having an inner diameter substantially the same as the outer diameter of said rib and extending from the radial abutment surface to the edge of the rib away from the sleeve end and said second surface having an inner diameter substantially the same as the outer surface of said sleeve and an interface between said first and second surface in locking contact with at least a portion of the edge of the rib away from the sleeve end; and
   c. an annular resilient seal comprising a radial outer portion having a shape substantially the same as and positioned within the annular space defined by said bevel, first inner surface and radial abutment surface; a deflectable radial inner portion which has an outer diameter substantially the same as the inner diameter of the socket and an inner diameter which is less than the inner diameter of the locking ring, said inner portion having along said outer diameter of said deflectable radial inner portion a first axially extending cylindrical sealing surface engaging the inner surface of the socket adjacent the end of the sleeve and a deflectable second sealing surface adapted for engagement with the outer surface of a pipe positioned in the pipe receiving socket; and an intermediate portion having a smaller radial and axial extent than said inner or outer portions and interconnecting said outer and inner portions, said intermediate portion being in substantial axial compression between the radial abutment surface and the end of the sleeve whereby the axial loading from the locking ring is transmitted through the intermediary of the intermediate portion.

2. A flexible-joint pipe coupling according to claim 1, wherein the axially extending portion is engageable over said rib on the coupling sleeve and extendable therealong, and said radial abutment surface of the locking ring extends inwardly of said axial extending portion, and wherein said axially extending portion has an axial extent greater than the axial extent of the seal and engageable tightly with the external surface of the coupling sleeve so as to apply a substantial radially inwardly directed force on said surface thereby to increase the resistance to radial rupture of the pipe receiving socket when said radially inner portion of the seal is deflected by entry of a pipe in the socket.

3. A flexible-joint type coupling according to claim 1, wherein said radially inner portion of the seal takes the form, in radial section, of a rounded T-shape with the stem extending radially inwardly.

4. A flexible-joint type coupling according to claim 1, including an anti-slip configuration for engagement with said radially intermediate portion of the seal which is provided on at least one of the surfaces of said outer end of the socket portion and said radial abutment surface of the locking ring, said configuration being arranged so as to oppose radial inward displacement of the intermediate portion and dislodgement of the seal from its assembled position.

5. A flexible-joint type coupling according to claim 4, wherein said anti-slip configuration comprises a sawtooth arrangement of teeth angled to oppose said radial inward displacement and provided on said radial portion of the locking ring.

* * * * *